United States Patent [19]
Janssen et al.

[11] Patent Number: 5,339,685
[45] Date of Patent: Aug. 23, 1994

[54] POSITIVE-DISPLACEMENT FLUID FLOW-MEASURING SYSTEM

[75] Inventors: Sylvain Janssen, Neuilly; Jacques Fournier, Bretigy s/Orge; Jean-Pierre Campain, Clamart, all of France

[73] Assignee: Schlumberger Industries, Paris, France

[21] Appl. No.: 874,292

[22] Filed: Apr. 27, 1992

[30] Foreign Application Priority Data

Apr. 26, 1991 [FR] France .................. 91 05211

[51] Int. Cl.$^5$ .................................................. G01F 15/02
[52] U.S. Cl. .................................................. 73/199; 73/261
[58] Field of Search ........................... 73/199, 253, 261

[56] References Cited

U.S. PATENT DOCUMENTS

| | | | |
|---|---|---|---|
| 2,080,183 | 5/1937 | Pigott | 73/199 |
| 3,633,420 | 1/1972 | Holzem | 73/199 |
| 3,788,142 | 1/1974 | Goransson | |
| 4,193,299 | 3/1980 | Holzem et al. | 73/199 |

FOREIGN PATENT DOCUMENTS

| | | | |
|---|---|---|---|
| 1585098 | 2/1981 | United Kingdom | 73/199 |
| 8204315 | 12/1982 | World Int. Prop. O. | |

*Primary Examiner*—Herbert Goldstein
*Attorney, Agent, or Firm*—Frishauf, Holtz, Goodman & Woodward

[57] ABSTRACT

A positive-displacement fluid flow measuring system, especially for hydrocarbon fuel dispensers. The measuring system comprises, in addition to a positive-displacement meter per se, a correction system for correcting the loss of head in the meter. The correction system comprises a differential pressure detector responsive to the difference between the pressures at the inlet and the outlet of the meter. The displacement of the membrane enables an external motor to be coupled to the shaft of the meter by means of the plates.

2 Claims, 2 Drawing Sheets

POSITIVE-DISPLACEMENT FLUID FLOW-MEASURING SYSTEM

The present invention relates to a positive-displacement flow-measuring system.

More particularly the invention concerns a system capable of measuring flows of fluids, especially of hydrocarbons, with high measuring accuracy, the system being based on measuring the fluid flow by positive-displacement.

The invention is applicable especially to implementing measuring units for hydrocarbon fuel dispensers, but not exclusively to this technical realm.

BACKGROUND OF THE INVENTION

In functional terms, hydrocarbon dispensers essentially comprise a pump to draw hydrocarbon from a storage tank and to force it to the dispenser nozzle, a measuring unit to measure the volume of hydrocarbon actually dispensed to the user, and a calculating unit to convert this measurement and to display the indication provided by the measuring unit in the form both of a volume and of price for the hydrocarbon dispensed.

In almost all hydrocarbon dispensers, there is only one principle at present which allows fluid to be metered with an error which does not exceed $10^{-3}$ of the amount measured over a flow range of not less than 1 to 20. Thus all fuel dispensers today are fitted with positive-displacement meters with a sealed piston, operating on the principle of a steam engine. The reciprocating displacement of a piston in a cylinder under drive from the pressure of the fluid, and as effected by automatic and synchronous opening of inlet and outlet valves, is converted into continuous rotary movement, and makes it possible to ensure the desired accuracy of measurement, by virtue of:

- correctly setting the opening and closing of the valves;
- perfect internal sealing;
- complete filling and emptying in each cycle:
- accurate incremental measurement of the angle of rotation.

The positive-displacement meter so formed is in general of large size and involves a non-negligible loss of head in order to overcome the internal friction between the moving pistons and the walls of the cylinders. As a consequence, this type of positive-displacement meter is equally a genuine hydraulic motor which can with no problem provide enough power also to drive the complex mechanisms of the volume/price calculators generally in use.

However, mechanical calculator units are now generally being replaced by electronic calculators, formed by a contact-free electronic detector of the rotation of the measuring unit. The need for hydraulic power which used to be required to drive the mechanical calculator no longer exists.

In addition it is known that, in the case of a hydrocarbon dispenser, the mechanical power which is needed to drive the pump or the electrical power is wasted.

In the light of this situation, an object of the present invention is to transform a simple positive-displacement meter system of low performance but high economy into a device giving the same accuracy as prior art meters, while being less sensitive to the nature of the fluid, which is of smaller dimensions and lower cost, and which exhibits smaller loss of head.

SUMMARY OF THE INVENTION

To attain this object, the invention provides a precision positive-displacement flow measuring system on the basis of a rotary mechanical meter device of positive-displacement type known per se but in which friction is continuously canceled by the action of a counteracting force whose strength is determined by a servo-mechanism.

The flow measuring system comprises a rotary mechanical positive-displacement meter having an inlet and an outlet for the fluid to be measured, means for deriving a signal representing the loss of head of the fluid between the inlet and outlet of the meter, and control means responsive to said signal to provide power to the mechanical meter for substantially canceling said loss of head.

It will be understood that the measuring system thus provided has the form of a system forming a servo control loop which provides the meter with the power it needs to cancel the loss of head between its inlet and its outlet, due to the friction between its moving and fixed parts.

In a preferred embodiment, the means for deriving the signal comprise a differential pressure detector between the inlet and the outlet of the meter, and the means for providing power comprise motor means controlled by said differential pressure signal to provide torque to said meter, thus tending to compensate for the loss of head.

BRIEF DESCRIPTION OF THE DRAWINGS

Embodiments of the invention are described by way of example with reference to the accompanying drawings, in which.

DETAILED DESCRIPTION

Figure 1:
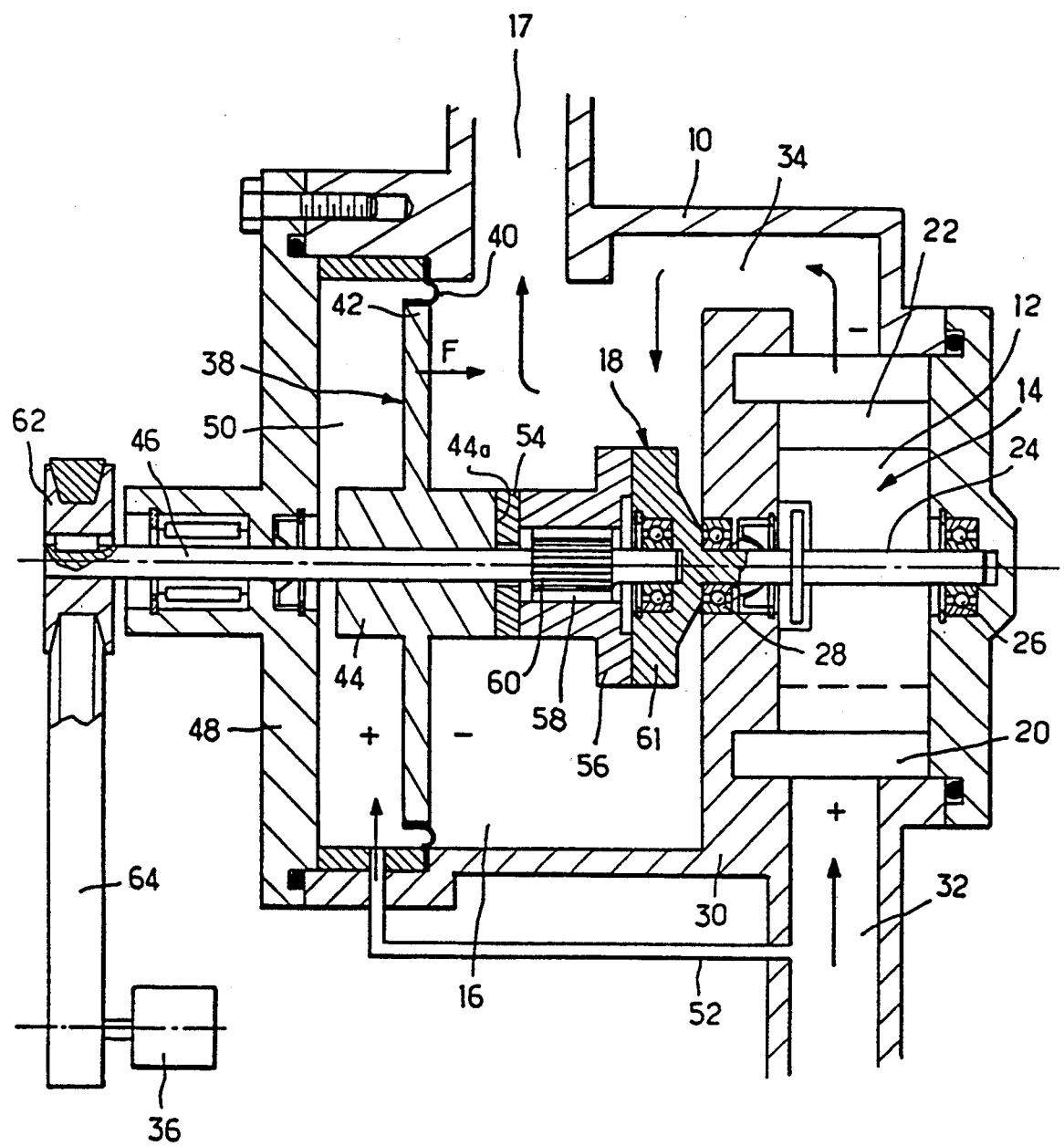
FIG. 1 is a vertical section through a measuring system constituting a first embodiment.

Referring initially to FIG. 1, a first embodiment of the measuring system of the invention will be described. This is enclosed inside a casing 10, which defines a first housing 12 in which the positive-displacement meter 14 is mounted and a second housing 16 in which the correcting device 18 is mounted. The housing 16 includes the outlet pipe 17 of the measuring system. The meter 14 is for example of gear type, formed by outer toothing 20 and inner toothing 22. Such meters are well known and are described for example in European patent application EP-A 0 344 059, filed in the name of the applicants. The driven gear 22 is fixed to a longitudinal shaft 24 mounted in bearings 26 and 28 fitted in the walls of the casing 10 and in a partition 30 separating the meter housing 12 from the correction system housing 16. The meter housing 12 includes an inlet duct 32 for the hydrocarbon to be measured and an outlet duct or passage 34 for this hydrocarbon. More specifically the passage 34 connects the housings 12 and 16.

When the pressure difference between the meter inlet 32 and its outlet 34 is not zero, the correction system 18 takes torque from a motor device 36 outside the casing 10 and applies it to the meter 14. To this end the correction system 18 essentially comprises a differential pressure detector with the general reference 38 and a coupling device controlled by the differential pressure detector 38 for transmitting mechanical power produced by the motor means 36 to the meter 14 for continuously cancelling the loss of head therein.

The differential pressure detector 38 is formed essentially of a deformable membrane 40, whose periphery is fixed to the sidewall of the casing 10, and a central plate 42. The middle part 44 of the plate 42 forms a hub which can slide freely on the shaft 46 connected to the motor means 36. Together with the wall 48 of the casing 10, the plate 42 and the deformable membrane 40 delimit a sealed chamber 50 into which there opens a duct 52 which connects the chamber 50 to the inlet pipe 32 of the meter 14. Thus the chamber 50 is kept continuously at a pressure equal to the inlet fluid pressure of the meter 14. It will be understood that the assembly formed by the deformable membrane 40 and the plate 42 is subjected to a pressure difference which is equal to the difference between the inlet pressure obtaining in the chamber 50 and the outlet pressure of the meter obtaining in the remainder of the housing 16. The hub 44 thus shifts on the shaft 46 when a pressure difference arises.

As FIG. 1 shows, the end face 44a of the hub 44 is fitted with an anti-friction washer 54. A first clutch plate 56 is mounted on the shaft 46 in such a manner that it is free to move in translation thereon but is constrained to rotate with the shaft. This is preferably effected by cooperation between internal and external splines 58 and 60 respectively formed inside the first clutch plate 56 and around the shaft 46. A second clutch plate 61 is fixed to the end of the shaft 24 of the meter 14, secured both against translation and against rotation. Friction material is placed between the facing faces of the clutch plates 56 and 61, to ensure friction under rotational sliding when they are progressively applied against each other.

In FIG. 1 the motor means 36 are represented by a pulley 62 mounted on the end of the shaft 46 and by a belt 64 coupling the pulley 62 to a motor which is the motor of the hydrocarbon dispenser, for example.

In the absence of flow in the meter 14, the plate 42 occupies its rest position, the middle part 44 of the plate 42 not being in contact with the disk 54. As a result the clutch plates 56 and 61 are not in contact either. When the flow is established in the meter 14, a pressure difference necessarily appears between the inlet 32 and the outlet 34 of the meter which, not being leakage-free, rotates with a speed which needs a correction to be metrologically correct.

The deformable membrane and its plate 42 then shift in the direction indicated by arrow F. This shift causes the first clutch plate 56 to move in translation in the same direction until it comes into contact with the second clutch plate 61 and drives it progressively by friction. The driving plate 56 always rotates at a greater speed than the driven plate 61 and transmits torque frictionally thereto which, by speeding up the meter 14, progressively reduces its loss of head, which tends to zero. In the end there is a substantially reduced residual loss of head which ensures constant application of the plates 56 and 61 to one another. Mechanical power is thus transmitted to the meter 14. This is increased up to a constant application, regulated by the servo-mechanism, which ensures an equilibrium state in which the gear meter 14 rotates with hardly any internal leakage and has thus attained high measuring accuracy.

The ideal state of zero loss of head is the better attained if it is ensured that the servo-mechanism thus formed has a high open-loop gain. This is essentially obtained by giving larger effective area to the differential pressure detector, i.e. the plate 42 and the deformable membrane 40. This result can likewise be attained by giving a high speed of rotation to the shaft 42 driven by the motor means 36.

The rotation of the meter shaft 24 is thus that of the clutch plate 61 and represents the flow of fluid passing through the meter 14. A rotary transducer, not shown in the drawing, can be fitted in the fluid in the vicinity of the plate 61 to measure the rotation of the latter and to provide for the metering of the fluid flow. It should also be mentioned that the fluid filling the housing 16 and which surrounds the mechanical power transmission system ensures its lubrication and cooling.

Figure 2:
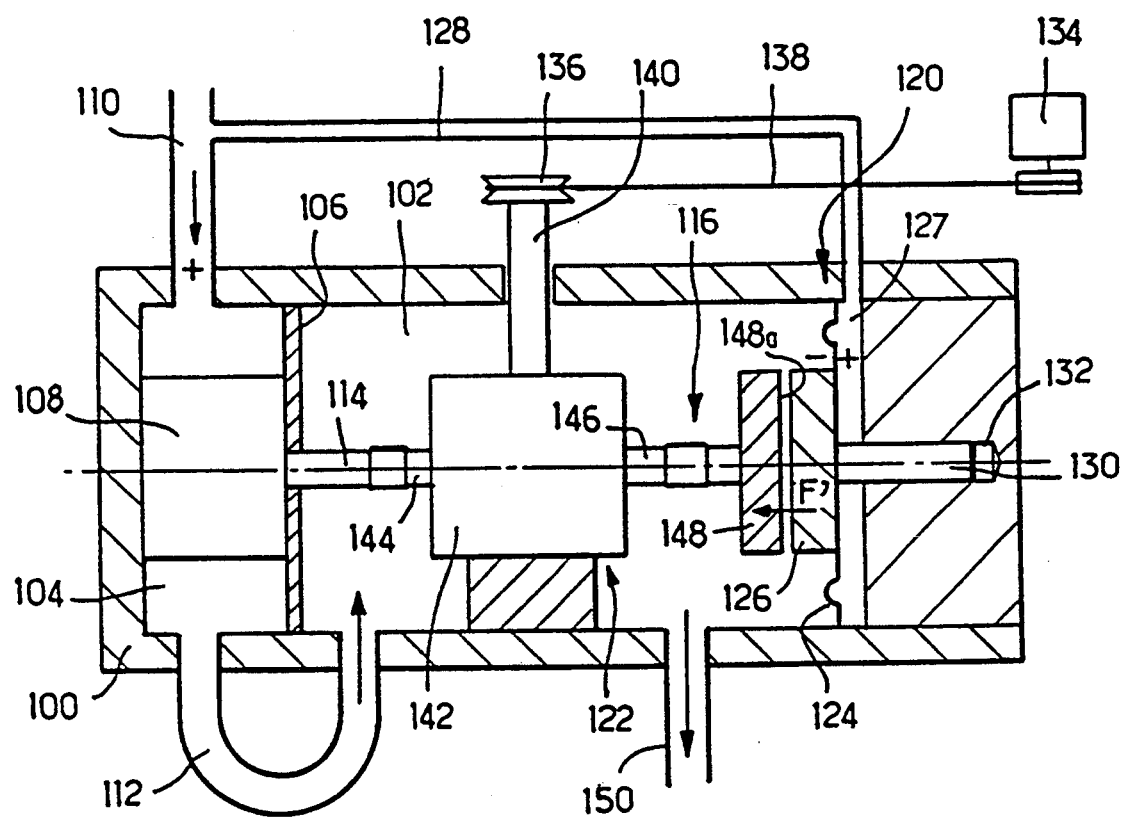
FIG. 2 is a vertical section through a second embodiment of the positive-displacement measuring unit.

Referring now to FIG. 2, a second embodiment of the measuring system will be described.

This likewise comprises a casing 100 which is partitioned by a sealed internal partition 106 into two housings referenced 102 and 104 respectively. A gear meter 108 of the type already described in connection with FIG. 1 is mounted to rotate in the housing 104. The housing 104 comprises a hydrocarbon inlet duct 110 and an outlet duct 112 which is connected directly to the housing 102. The positive-displacement meter 108 comprises an output shaft 114 which is mounted to turn in sealed manner in the partition 106 and also extends into the housing 102. The housing 102 contains the correction system 116. This is formed in its essentials by a differential pressure detector 120 and a member 122 for transmitting mechanical power. As in the case of FIG. 1, the differential pressure detector 120 is formed by a deformable membrane 124, to which a central plate 126 is fixed. Together with a wall of the casing 100, the membrane 124 and the plate 126 delimit an internal chamber 127. The internal chamber 127 communicates with the hydrocarbon inlet duct 110 through a duct 128. The pressure in the chamber 127 is thus equal to the inlet pressure of the hydrocarbon in the meter 108. Furthermore the plate 126 is fixed to a shaft 130 mounted to slide in a seat 132 of the wall of the casing.

The mechanical correction power is provided by motor means 134 whose output is connected to a pulley 136 by a belt 138. The pulley 136 is mounted on the end of a shaft 140 which passes in sealed manner through the wall of the casing 100. The shaft 140 forms the central shaft of a differential system with the general reference 142. As is well known, the differential system 142 comprises a first output shaft 144 which is constrained to rotate with the shaft 114 of the meter 108 and a second output shaft 146 which is fixed to a brake plate 148 facing the plate 126 of the differential pressure detector. The plate 148 is provided with a friction material on its face 148a. Finally the housing 102 comprises an outlet duct 150 which forms the outlet of the measuring system.

The operation of the second embodiment of the measuring system is as follows. When the positive-displacement meter 104 suffers a loss of head, a pressure difference is applied to the deformable membrane 124. This results in a shift of the plate 126 in the direction indicated by arrow F. The plate 126 comes into contact with the brake disk 148, which causes the speed of rotation V2 of the shaft 146 of the differential 142 to fall. Since the speed of rotation V of the shaft 140 driven by the motor means 134 being constant, the speed of rotation V1 of the shaft 144 increases, so transmitting mechanical power to the positive-displacement meter 108. This contribution of power tends to cancel the loss of head, and accordingly the fluid pressure difference between the inlet 110 and the outlet 112. The loss of head remains canceled as long as the plate 126 is kept in contact with a pressure regulated by the membrane servo-mechanism. It will be understood that a control loop for the meter is thus realized, such that the pressure difference at the interfaces of the meter will always be zero.

It will also be understood that this servo control to compensate for losses of head prevents the occurrence of leaks inside the meter. This results in the measuring accuracy of the meter, which was mediocre to begin with, being improved considerably, even when the meter is accelerating.

It goes without saying that there is no departure from the scope of the invention if another type of differential pressure detector is associated with the positive-displacement meter or another coupling mechanism is provided between the external motor means and the shaft of the meter, for continuously compensating the internal friction of the meter.

We claim:

1. A flow measuring system comprising:
   a rotary mechanical positive-displacement meter with a shaft, and having an inlet and an outlet for fluid to be measured,
   means including a differential pressure detector for deriving a signal representing a loss of head of the fluid between said inlet and said outlet, wherein said differential pressure detector comprises a deformable membrane responsive to a difference between pressures of the fluid at said inlet and said outlet,
   motor means to provide power to said mechanical meter, and
   control means responsive to said signal for controlling said motor means to cancel substantially said loss of head, including:
   a differential gear system coupling said motor means to said meter shaft and having an input shaft, a first output shaft, and a second output shaft, said first output shaft being connected to the shaft of said meter, said input shaft being coupled to said motor means,
   braking means engageable with said second output shaft in response to said loss of head, and
   wherein said braking means responds to deformation of said membrane, when said difference is not zero, for braking said second output shaft and thereby causing an increase in the speed of rotation of said first output shaft.

2. A measuring system according to claim 1, wherein said braking means includes a plate and a brake disk, with one being on the membrane and the other being on the second output shaft so as to be brought into engagement with each other by deformation of said membrane.

* * * * *